July 14, 1936.  S. INOUE  2,047,324
APPARATUS FOR EMITTING VOLATILE MATTERS
OF MEDICINAL MATTERS BY FUMIGATION
Filed July 15, 1935
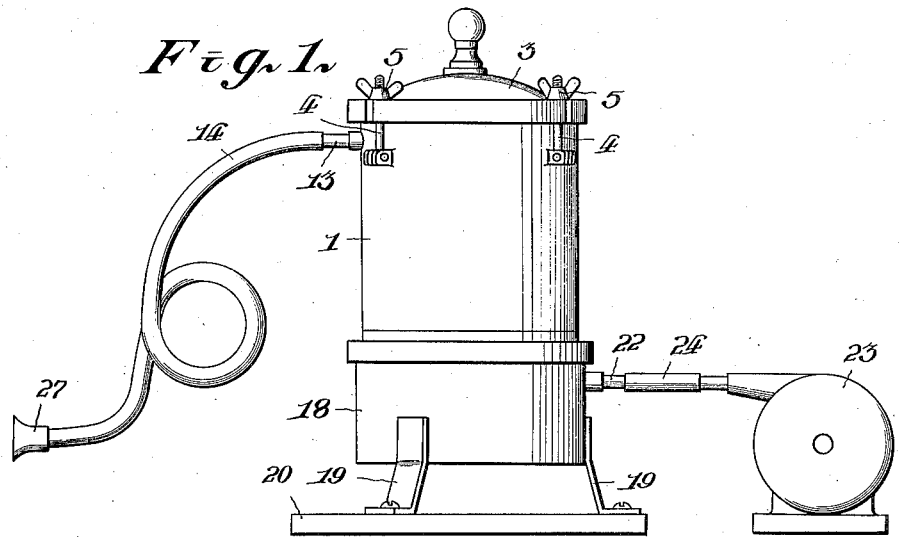
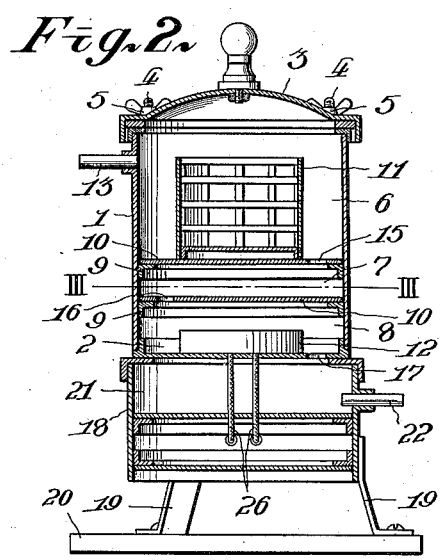
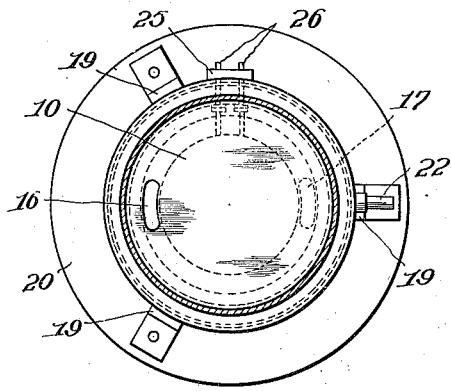
INVENTOR.
S. Inoue
BY
ATTORNEY.

Patented July 14, 1936

2,047,324

UNITED STATES PATENT OFFICE 2,047,324

APPARATUS FOR EMITTING VOLATILE MATTERS OF MEDICINAL MATTERS BY FUMIGATION

Shintaro Inoue, Kobe-ku, Kobe-shi, Japan

Application July 15, 1935, Serial No. 31,517
In Japan January 26, 1935

1 Claim. (Cl. 128—192)

This invention relates to an apparatus for emitting volatile matters of medicinal matters fumigated by means of an electric heating device from an outlet by means of a forced draft, and has for its object to provide an apparatus for emitting volatile matters of medicinal matters having high remedial value, at suitable temperature.

In the accompanying drawing—

Fig. 1 is an elevation of an apparatus embodying the invention, with attachments.

Fig. 2 is a vertical sectional view of the apparatus, the attachments being removed.

Fig. 3 is a cross sectional top plan view taken on the line III—III of Fig. 2.

Referring to the drawing, 1 represents a cylindrical casing provided with a bottom 2 snugly fitted therein and a cover 3 which may be secured in position by means of screw bolts 4 pivoted on the casing and thumb nuts 5, the cover being notched at its circumferential edge for extending the screw bolts therethrough. The casing is horizontally partitioned into several compartments. In the illustration, the cylinder is divided into three compartments 6, 7 and 8 by partitions, each of which may be formed by a soldered circular angle member 9 and a removable circular plate 10. The upper compartment 6 is larger and is adapted to receive medicinal matters in a receptacle 11, such as an open-work basket, as a fumigating chamber, and each of the other compartments is smaller and adapted to receive an electric heating device 12. The casing is provided with a nipple 13 for discharging volatilized matter and adapted for the connection of a flexible pipe 14. Each of the partition walls and the bottom wall of the casing is formed with an opening as indicated by 15, 16, and 17, respectively, near the casing side wall and in a staggered relation, preferably in a phase difference of 180 degrees between adjacent ones for the purpose which will readily be understood later.

The casing 1 is mounted on a cylindrical standard 18 with legs 19 and a base 20, which standard is preferably larger than the casing in diameter for securing their stability. The standard is suitably, horizontally partitioned so as to provide a draft chamber 21 in its upper part. The draft chamber is centrally opened at the top so as to communicate with the opening 17 provided in the bottom of the casing, and there is provided an inlet 22 adapted to connect with a fan 23 by means of a connecting pipe 24. 25 represents an insulating member attached to the standard 18, and through which conductors 26 are connected with the electric heating device 12.

Suitable medicinal matters, which may be a medicinal herb, are put in the receptacle 11, through means of the cover 3, and an electric current is suppled to the electric heating device 12 which may be placed in any suitable compartment of the casing 1 under the fumigating chamber 6, and a forced draft is admitted into the draft chamber 21 through the inlet 22 by means of the fan 23. In this manner, the medicinal matter in the receptacle 11 is fumigated by the heat radiating from the electric heating device, whereby the volatile matters in the medicinal matter are volatilized. The volatilized matters of a suitable temperature are admixed with air current preheated to a suitable temperature by the electric heating device on its way from the draft chamber 21 to the fumigating chamber 6, making detours due to the openings 15, 16 and 17 being in a staggered relation. The volatilized matters of a suitable temperature are carried from the fumigating chamber onto the affected part of the human body by air current through means of the flexible pipe 14 which may be provided at the free end with a suitable mouth piece 27. The preheating of air is important for purpose of preventing the volatilized matters from causing a condensation on encountering with cold air otherwise, and maintaining the volatilized matters at a suitable temperature after mixing with air.

Having now particularly described and ascertained the nature of my said invention and in what manner the same is to be performed, I claim:—

An apparatus for emitting volatile substances of medicinal character, said apparatus comprising a hollow cylindrical standard, a source of air pressure, and a conduit connecting the source of air pressure to said cylindrical standard, said standard having a flanged annulus resting thereon, a cylindrical casing with an apertured removable bottom resting on said standard, apertured removable partitions supported in said cylindrical casing and dividing said casing into a plurality of chambers of which the uppermost is the largest and forms a vaporizing chamber while the others form air heating chambers, a cradle for holding vaporizable medical substance in said vaporizing chamber, a pivoted top for said chamber, fastening means for securing said top airtight on said cylindrical casing, a source of heat in one of the heating chambers and a flexible tube communicating with the vaporizing chamber, the apertures of said partitions and said bottom being all arranged in staggered relation, one to another.

SHINTARO INOUE.